United States Patent [19]

Rock

[11] Patent Number: 4,514,327

[45] Date of Patent: Apr. 30, 1985

[54] FIRE RETARDANT MEANS AND METHOD

[76] Inventor: James E. Rock, 412 E. Lorengo Ave., Norfolk, Va. 23503

[21] Appl. No.: 456,706

[22] Filed: Jan. 10, 1983

[51] Int. Cl.$^3$ .............................................. C09K 7/00
[52] U.S. Cl. .................................... 252/607; 8/116.1; 106/18.13; 162/159; 252/5; 252/7; 252/608; 427/317; 428/921
[58] Field of Search ...................... 8/116 P; 106/18.13; 162/159; 252/2, 5, 7, 604, 607, 608; 427/317; 428/921

[56] References Cited

U.S. PATENT DOCUMENTS

| | | | |
|---|---|---|---|
| 1,738,976 | 10/1929 | Vivas | 252/607 |
| 2,386,471 | 10/1945 | Jones et al. | 252/607 |
| 3,497,454 | 2/1970 | Perizzolo | 252/607 |
| 4,072,473 | 2/1978 | Radkowski et al. | 44/46 |
| 4,224,169 | 9/1980 | Retana | 252/607 |

FOREIGN PATENT DOCUMENTS 11320 of 1911 United Kingdom ................ 252/607

OTHER PUBLICATIONS

Lucifer, Silk Journal and Rayon World, Nov. 1942, pp. 19, 20 and 22.

*Primary Examiner*—Leland A. Sebastian

[57] ABSTRACT

This invention is a fire retardant compound and the method for preparing the same. The combined fire retardant properties of the final composition are greater than the fire retardant properties of the individual ingredients. When formulated and treated in accordance with the present invention, wood products such as paneling and flooring, fabric products such as cotton, wool and rayon and the like which are normally flammable are for all practical purposes noncombustible. Not only are the flame retardant properties of the present invention highly unusual but also the smoke inhibiting factor in each case is extremely low and way below that which would normally be anticipated.

17 Claims, No Drawings

FIRE RETARDANT MEANS AND METHOD

FIELD OF INVENTION

This invention relates to fire retardants and more particularly to fire retardant and smoke inhibiting compositions for treating normally flammable products.

BACKGROUND OF INVENTION

In the past various chemicals and chemical compositions have been used to treat normally flammable products to make them less flammable and to act as a smoke retardant. Some of these treatments have included ammonium sulfate, borax, boric acid and monoammonium phosphate and even on occasion a combination of two of the same. The odor, toxicity, smoke development and flame spread vary between the various compounds and these characteristics are well documented. None of these compounds nor the combination of any two thereof give completely satisfactory results since the characteristics of each are better in certain areas than others. Also when two of these compounds have been combined in the past, no more than anticipated results were achieved.

BRIEF DESCRIPTION OF INVENTION

After much research and study into the above-mentioned problems, the present invention has been developed which combines ammonium sulfate, borax, boric acid and monoammonium phosphate in percentages by weight within a very critical range to give highly unusual and unexpected results in providing a superior fire retardant and smoke inhibitor much greater than the best characteristics exhibited by each of the compounds individually. This highly unusual phenomenon renders normally highly flammable products such as woven cotton and wood for all practical purposes noncombustible with no flame spread and an absolute minimum of smoke density even after prolonged exposure to open flame.

In view of the above, it is an object of the present invention to provide a fire retardant compound which gives superior test results.

Another object of the present invention is to provide a superior fire retardant compound for application on cotton, rayon and wood fabrics.

Another object of the present invention is to provide a superior fire retardant compound for use on paper and wood products.

Another object of the present invention is to provide a fire retardant compound formed from ammonium sulfate, borax, boric acid and monoammonium phosphate which gives superior fire retardant and smoke suppressant characteristics to the sum of the individual characteristics.

Another object of the present invention is to provide a superior fire retardant and smoke suppressant which is nontoxic in nature.

Other objects and advantages of the present invention will become apparent and obvious from a study of the following description and the accompanying drawings which are merely illustrative of such invention.

DETAILED DESCRIPTION OF INVENTION

The present invention has been developed to provide a liquid or organic fire retarding chemical with special application techniques for fibrous materials such as soft woods, hard woods, cotton, rayon, wood and paper products.

The basic formula by weight is set forth as follows: 42% ammonium sulfate, 28% borax (5 molar), 11% boric acid; 19% monoammonium phosphate. Although the basic formula can be varied slightly depending on the intended uses of the finished product, the percentages of the ingredients are critical to within 5 to 8%. Also additives can be introduced such as surfactants in flexible products to help them retain their texture and other physical properties which might otherwise be interfered with by the addition of the basic formula.

PHYSICAL CHARACTERISTICS OF INVENTION

Density:
  67 pounds per cubic foot
  2.77 pounds per gallon
PH: 6.8–7.4
Odor: None
Toxicity: None
Asbestos Content: None
Color:
  Pale yellow-green (straw)
  Translucent (almost clear)
Baume: 26% solids solution = 16 Be
Temperature Range: 0–155 degrees Fahrenheit

PROCESS FOR PREPARATION OF BASIC FORMULA

The dry chemicals of the basic formula are measured by weight and added to a metallic, ribbon blender to thoroughly mix. This mixture must be kept out of high humidity areas as the chemicals are hygroscopic and will begin to solidify within 15 minutes.

An appropriate amount of water, depending on the desired size of the finished batch, is added to a stainless steel or plastic liquid mixing vat. It is critical that the temperature of the water before introduction of the dry chemicals be between 125 to 145 degrees Fahrenheit for proper dilution of the chemicals without negatively affecting the borax and boric acid which are temperature sensitive.

Agitation is added to the vat through the use of an impeller type agitator or through the use of a high volume flow pump which suction is taken from the bottom of the vat and whose discharge is to the top of the vat. In either case, a vortex must be created to assure dilution of the dry chemicals into solution.

Once the vortex is created and maintained, the appropriate amount of dry chemical mix to yield the desired percentage of solids in the finished product is added at the rate of 0.25 pounds of mixed formula per gallon of water per minute. This flow rate is critical to insure proper and thorough dilution of the dry chemicals.

Agitation is continued after the addition of the total desired amount of dry components for 30 minutes or until the temperature of the solution has cooled to approximately 109 degrees Fahrenheit.

The solution is them pumped through a series of filters, the first a 5 micron compressed fiber filter and the second a charcoal bed filter. The purpose of these filters is to remove impurities and to stabilize the solution so that its effective temperature range is increased, therefore, eliminating perceptible precipitates at temperature extremes of both freezing and boiling.

Once the above procedure has been completed, the resultants of the solution (usually consisting of approximately 26% solids) can be stored or shipped to treatment facilities where final additives can be inserted depending on application. Along this line, wood vacuum-pressure-vacuum (VPV) treatment with the solution of the present invention requires no additives. For fabric applications, however, surfactants such as Actfos 110 are added at the rate of approximately 1% by volume to the formulated solution to facilitate fabric softness and workability.

WOOD APPLICATION PROCESS

Wood products, whether hard woods or soft woods and in either plank or plywood laminate forms can be treated to increase fire retardancy. This is usually accomplished through a consecutive vacuum, pressure, vacuum process.

More specifically, the wood to be treated is placed in a pressure vessel of appropriate size, the same is sealed, and a vacuum of approximately 28 inches of mercury is applied for approximately 10 minutes. While maintaining the vacuum, the vessel is filled with fire retardant solution and once filled so that all of the material is submerged, a pressure of between 45 and 100 psi is applied. This pressure is maintained from 10 to 60 minutes after which the chamber is drained of fluid and a vacuum of approximately 28 inches of mercury is redrawn for a period of approximately 10 minutes.

The range of time periods and pressures are variables dependent on the material being treated and the results desired.

The first vacuum stage evacuates the cells of the wood of both air and moisture. When the vacuum is held during the addition of the fluid to the vessel, such fluid readily enters these open pores and with the subsequent application of pressure, deep, thorough penetration of the fire retardant chemical is achieved. The final vacuum stage removes excess fluid and surface dries the boards or sheets being treated.

After the vacuum is released and the pressure inside the chamber is returned to ambient atmospheric pressure, the now treated wood material can be removed and stacked as appropriate for final drying.

The liquid chemical formulation described above can also be applied through dipping, spraying, brushing or rolling techniques with varying degrees of success depending on the material being treated.

TEST RESULTS OF WOOD APPLICATIONS

Interior and exterior grades of plywood sheathing with thicknesses of ⅜", ½", ⅝", and ¾", have been satisfactorily tested following the VPV application method described above with the following results:
Seiner Tunnel, ASTM E-84 (20 ft.)
  0 Flame spread
  5 Smoke density index
  10 Fuel contribution
Oxygen Index ASTM D-2863-77
  100% Rating indicating the product would not burn in a 100% oxygen atmosphere
British Standard 476: Part 6: 1981,
Fire Propogation
  0 Surface spread Rendering it within the limits of Classes 1 to 4
ANSI/UL Standard 1482, Brand Fire and Flash Fire Testing Determined to be Non-combustible
Determined to be equivalent or superior to ⅜" asbestos mill board in the protection of combustible walls exposed to prolonged use of heating appliances.

In each of the above tests, it was noted by experienced laboratory technicians that the results obtained were superior to any results previously obtained from wood materials of similar type treated with various fire retardant chemicals. The typical loading of fire retardant chemical to the tested specimen was 1.4 to 1.9 pounds per cubic foot of wood.

Using prior known fire retardants with a loading of 4 pounds per cubic foot has been found to achieve flame spread results of less than 20 while with a loading of less than 2 pounds per cubic foot of the retardant of the present invention, the flame spread results were zero.

FABRIC APPLICATION PROCESS

Cotton, rayon and wool fabrics have been treated through use of spray and immersion techniques using the liquid chemical formulation of the present invention with unequaled results. The most common technique used is immersion. In this method, a vat is filled with the formulated solution which contains approximately 26% solids with a surfactant added to about 1% by volume and the fabric pieces lowered in a basket into the vat. The fabric pieces are then agitated for approximately 15 minutes or until complete saturation has been achieved.

Following saturation, the fabric is removed from the vat and passed through a light rolling press to remove excess moisture. If necessary the fabric can be inserted into a centrifugal extractor to facilitate even removal of excess moisture. Finally the fabric is placed into a commercial heat drying unit for final preparation and fluffing.

Rolled goods, as distinguished from piece goods, are continually fed through a bath containing the solution of the present invention, then through a roller and a continuous line dryer with final rolling onto bolts.

FABRIC TEST RESULTS FOR FABRIC APPLICATIONS

Fabric samples treated as described above have been tested with the following results:
ANSI/UL E84-81A Steiner 20 ft. Tunnel flame spread
  0 Flame spread
  0 Smoke developed
    (Typial results for fire retarded carpets are 15 and 200)
ANSI/UL E648 Critical Radiant Flux
  1.08 (the most rigorous standard requires at least a 0.4 rating. This product is far in excess.
ANSI/UL 16CFR Chapter 11 Pill Test
  30+ on all of the 8 samples submitted (expected results for cotton are FAIL)
ANSI/UL D-2863-77 Oxygen Index
  100 Rating meaning the product would not burn even in a 100% oxygen atmosphere Using prior known fire retardants in treating fabric such as cotton fabrics, even with a loading of 12 to 18%, inferior fire retardant properties were found compared to the outstanding results gained through loadings of only 4 to 6% of the retardant of the present invention.

COMPARISON OF FIRE RETARDANT PROPERTIES

The novelty of the present invention lies in the fact that the combined properties of the formulation is greater than the properties of the chemical used. Also the precise method of preparing the formulation of the present invention and the application techniques are of significant consequence.

In tests conducted by the Forest Products Laboratory of the Forest Service, U.S. Department of Agriculture, the following results were obtained through the use of the components of the present formulation when applied individually to Douglas fir boards and this is compared to the results from the present invention:

|  | Loading (lb/cuft) | Flame Spread | Smoke Developed |
|---|---|---|---|
| Borax | 2.1 | 70 | 78 |
|  | 3.1 | 55 | 58 |
|  | 4.6 | 53 | 28 |
|  | 7.3 | 43 | 21 |
| Boric Acid | 1.9 | 77 | 45 |
|  | 2.9 | 71 | 22 |
|  | 4.1 | 67 | 74 |
|  | 5.9 | 60 | 210 |
| Monoammonium Phosphate | 1.5 | 64 | 161 |
|  | 3.0 | 40 | 193 |
|  | 6.1 | 15 | 346 |
| Ammonium Sulfate | 2.1 | 78 | 40 |
|  | 3.1 | 65 | 18 |
|  | 4.0 | 50 | 113 |
|  | 3.1 | 39 | 105 |
| Results for this invention | 1.4–1.9 | 0 | 5 |

It is obvious from the above results that the carefully proportioned formulation of the present invention prepared in the manner described gives results superior to the best results of the component parts of such formulation.

The use of magnetics in the bottom of the liquid mixing tank is recommended to facilitate the removal of impurities and to eliminate suspended earthen metallic materials which tend to clog the filtration systems and can act as a damping agent on application to tightly poured products being treated.

While 10 molar borax is the industry prescribed fire retardant agent due to its improved ease of entering into solution, in the present combination of elements, the 5 molar borax proves superior. In repeated tests, the 5 molar borax yields far less afterburn upon the completion of flame spread tests than 10 molar borax.

The use of metallic salts in the formulation of the present invention is of particular significance in that the gases emitted upon the application of heat tends to act as an extinguishing agent smothering in a resultant flame.

In view of the above, it is obvious that the present invention has the advantage of providing a nontoxic odorless flame retardant with properties greater than any of the properties of the individual components therein. This improved fire retardant formulation is relatively inexpensive to provide thus adding even more to the advantages of its production and use.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A fire retardant composition formed from the following ingredients: ammonium sulfate; borax; boric acid; and monoammonium phosphate whereby a fire retardant compound is formed which has fire retardant properties and smoke inhibiting factors which are greater than sum of the individual ingredients.

2. The composition of claim 1 wherein said ingredients are approximately, within 5 to 8% by weight, 42% ammonium sulfate, 28% borax; 11% boric acid; and 19% monoammonium phosphate.

3. The composition of claim 1 wherein the borax is 5 molar.

4. The method of preparing a fire retardant composition comprising: mixing dry ammonium sulfate, borax, boric acid, and monoammonium phosphate; placing water heated to between approximately 125 to 145 degrees Fahrenheit within a container; creating a vortex within said container; adding the dry mix at the rate of approximately 0.25 pounds per gallon of water per minute until the desired consistency of solids is achieved; continuing the vortex mixing for approximately thirty minutes or until the solution has cooled to approximately 109° Fahrenheit; and passing the solution through a series of filters whereby a highly improved fire retardant compound is formed.

5. The method of claim 4 wherein the dry chemicals consist of approximately, within 5 to 8% by weight, 42% ammonium sulfate, 28% borax, 11% boric acid, and 19% monoammonium phosphate.

6. The method of claim 4 wherein said borax is 5 molar.

7. The method of claim 4 wherein said filter is of the 5 micron type.

8. The method of applying a fire retardant to fiberous products comprising: placing such products within a sealed enclosure; drawing a vacuum of approximately 28 inches of mercury within said enclosure for approximately 10 minutes while maintaining said vacuum; filling said enclosure with a fire retardant solution including ammonium sulfate, borax, boric acid, monoammonium phosphate, until said products are submerged, creating a pressure within said enclosure of between 45 and 100 psi; maintaining such pressure from 10 to 60 minutes; draining the solution from the enclosure; and redrawing a vacuum of approximately 28 inches of mercury within said enclosure for a period of approximately 10 inches whereby superior fire retardant properties can be given to said fiberous products.

9. The method of claim 8 wherein the solution consists of approximately 26% solids.

10. The method of claim 9 wherein said solids are composed of approximately, within 5 to 8% by weight, 42% ammonium sulfate; 28% 5 molar borax; 11% boric acid; and 19% monoammonium phosphate.

11. The method of claim 8 wherein said borax is 5 molar.

12. The method of applying a fire retardant compound to a fabric comprising: impregnating said fabric with a solution containing ammonium sulfate, borax, boric acid, and monoammonium phosphate; removing excess moisture from said fabrics; and drying said fabrics whereby improved fire retardant qualities are given thereto.

13. The method of claim 12 wherein said fabrics are impregnated by immersion in said solution.

14. The method of claim 12 wherein said fabrics are impregnated by spraying.

15. The method of claim 12 wherein the solution consists of approximately 26% solids.

16. The method of claim 15 wherein said solids are composed of approximately, within 5 to 8% by weight, 42% ammonium sulfate; 28% 5 molar borax; 11% boric acid; and 19% monoammonium phosphate.

17. The method of claim 12 wherein said borax is 5 molar.

* * * * *